United States Patent
Melanson et al.

(10) Patent No.: US 9,184,661 B2
(45) Date of Patent: Nov. 10, 2015

(54) POWER CONVERSION WITH CONTROLLED CAPACITANCE CHARGING INCLUDING ATTACH STATE CONTROL

(71) Applicant: Cirrus Logic, Inc., Austin, TX (US)

(72) Inventors: John L. Melanson, Austin, TX (US); Eric J. King, Dripping Springs, TX (US)

( * ) Notice: Subject to any disclaimer, the term of this patent is extended or adjusted under 35 U.S.C. 154(b) by 293 days.

(21) Appl. No.: 13/836,423

(22) Filed: Mar. 15, 2013

(65) Prior Publication Data
US 2014/0055055 A1    Feb. 27, 2014

Related U.S. Application Data (60) Provisional application No. 61/693,351, filed on Aug. 27, 2012.

(51) Int. Cl.
*H02M 3/335* (2006.01)
*H05B 33/08* (2006.01)

(52) U.S. Cl.
CPC ........... *H02M 3/335* (2013.01); *H05B 33/0809* (2013.01); *H05B 33/0815* (2013.01)

(58) Field of Classification Search
CPC ......... A63H 3/006; A63H 3/38; H02M 3/335; H05B 41/232; H05B 33/0815; H05B 33/0809
USPC ....................................................... 315/228
See application file for complete search history.

(56) References Cited

U.S. PATENT DOCUMENTS

| | | |
|---|---|---|
| 4,523,128 A | 6/1985 | Stamm et al. |
| 5,055,746 A | 10/1991 | Hu et al. |
| 5,179,324 A | 1/1993 | Audbert |
| 5,319,301 A | 6/1994 | Callahan et al. |
| 5,321,350 A | 6/1994 | Haas |
| 5,430,635 A | 7/1995 | Liu |

(Continued)

FOREIGN PATENT DOCUMENTS

| | | |
|---|---|---|
| CN | 1421986 A | 6/2003 |
| CN | 1459216 A | 11/2004 |

(Continued)

OTHER PUBLICATIONS

NXP Semiconductors—SSL2101 Dimmable GreenChip Driver for LED Lighting, Product Data Sheet, Rev. 4.1, Dec. 5, 2011, © NXP B.V. 2011, 23 pages.

(Continued)

*Primary Examiner* — Lincoln Donovan
*Assistant Examiner* — David Mattison
(74) *Attorney, Agent, or Firm* — Terrile, Cannatti, Chambers & Holland, LLP; Kent B. Chambers (57) ABSTRACT

An electronic system includes a controller that actively controls a rate of charging and discharging of an energy storage capacitor to maintain compatibility with a dimmer. The controller actively controls charging of a capacitor circuit in a switching power converter to a first voltage level across the capacitor circuit. The controller further allows the capacitor to discharge to obtain a second voltage level across the capacitor circuit. The second voltage level is sufficient to draw a current through a phase-cut dimmer to prevent the dimmer from prematurely resetting. The first voltage is sufficient to allow the capacitor to discharge to the second voltage level during each cycle of the line voltage.

23 Claims, 5 Drawing Sheets

(56) References Cited

U.S. PATENT DOCUMENTS

| | | |
|---|---|---|
| 5,604,411 A | 2/1997 | Venkitasubrahmanian et al. |
| 5,629,607 A | 5/1997 | Callahan et al. |
| 5,661,645 A | 8/1997 | Hochstein |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman et al. |
| 6,211,624 B1 | 4/2001 | Holzer |
| 6,380,692 B1 | 4/2002 | Newman et al. |
| 6,407,514 B1 | 6/2002 | Glaser et al. |
| 6,621,256 B2 | 9/2003 | Muratov et al. |
| 6,713,974 B2 | 3/2004 | Patchornik et al. |
| 6,714,425 B2 | 3/2004 | Yamada et al. |
| 6,858,995 B2 | 2/2005 | Lee et al. |
| 6,900,599 B2 | 5/2005 | Ribarich |
| 7,102,902 B1 | 9/2006 | Brown et al. |
| 7,180,250 B1 | 2/2007 | Gannon |
| 7,184,937 B1 | 2/2007 | Su et al. |
| 7,339,329 B2 | 3/2008 | Makimura et al. |
| 7,656,103 B2 | 2/2010 | Shteynberg et al. |
| 7,719,246 B2 | 5/2010 | Melanson |
| 7,728,530 B2 | 6/2010 | Wang et al. |
| 7,733,678 B1 | 6/2010 | Notohamiprodjo et al. |
| 7,750,580 B2 | 7/2010 | Lu et al. |
| 7,759,881 B1 | 7/2010 | Melanson |
| 7,786,711 B2 | 8/2010 | Wei et al. |
| 7,872,427 B2 | 1/2011 | Scianna |
| 7,982,415 B2 | 7/2011 | Kimura |
| 8,102,167 B2 | 1/2012 | Irissou et al. |
| 8,115,419 B2 | 2/2012 | Given et al. |
| 8,169,154 B2 | 5/2012 | Thompson et al. |
| 8,212,491 B2 | 7/2012 | Kost |
| 8,212,492 B2 | 7/2012 | Lam et al. |
| 8,222,832 B2 | 7/2012 | Zheng et al. |
| 8,482,220 B2 | 7/2013 | Melanson |
| 8,487,546 B2 | 7/2013 | Melanson |
| 8,508,147 B2 | 8/2013 | Shen |
| 8,536,794 B2 | 9/2013 | Melanson et al. |
| 8,536,799 B1 | 9/2013 | Grisamore et al. |
| 8,547,034 B2 | 10/2013 | Melanson |
| 8,569,972 B2 | 10/2013 | Melanson |
| 8,581,518 B2 | 11/2013 | Kuang et al. |
| 8,610,364 B2 | 12/2013 | Melanson |
| 8,610,365 B2 | 12/2013 | King et al. |
| 8,664,885 B2 | 3/2014 | Koolen et al. |
| 8,716,957 B2 | 5/2014 | Melanson et al. |
| 8,749,173 B1 | 6/2014 | Melanson et al. |
| 8,847,515 B2 | 9/2014 | King et al. |
| 2002/0140371 A1 | 10/2002 | Chou et al. |
| 2004/0105283 A1 | 6/2004 | Schie et al. |
| 2004/0212321 A1 | 10/2004 | Lys |
| 2006/0022648 A1 | 2/2006 | Ben-Yaakov et al. |
| 2006/0208669 A1 | 9/2006 | Huynh et al. |
| 2007/0182338 A1 | 8/2007 | Shteynberg et al. |
| 2007/0182347 A1 | 8/2007 | Shteynberg |
| 2008/0018261 A1 | 1/2008 | Kastner |
| 2008/0101098 A1 | 5/2008 | Disney |
| 2008/0143266 A1 | 6/2008 | Langer |
| 2008/0192509 A1 | 8/2008 | Dhuyvetter et al. |
| 2008/0203934 A1 | 8/2008 | Van Meurs |
| 2008/0205103 A1 | 8/2008 | Sutardja et al. |
| 2008/0224629 A1 | 9/2008 | Melanson |
| 2008/0224633 A1 | 9/2008 | Melanson |
| 2008/0224636 A1 | 9/2008 | Melanson |
| 2009/0134817 A1 | 5/2009 | Jurngwirth et al. |
| 2009/0135632 A1 | 5/2009 | Sohma |
| 2009/0195186 A1 | 8/2009 | Guest et al. |
| 2009/0284182 A1 | 11/2009 | Cencur |
| 2010/0002480 A1 | 1/2010 | Huynh et al. |
| 2010/0013405 A1 | 1/2010 | Thompson et al. |
| 2010/0013409 A1 | 1/2010 | Quek et al. |
| 2010/0066328 A1 | 3/2010 | Shimizu et al. |
| 2010/0164406 A1 | 7/2010 | Kost et al. |
| 2010/0213859 A1 | 8/2010 | Shteynberg |
| 2010/0231136 A1 | 9/2010 | Reisenbauer et al. |
| 2010/0244726 A1 | 9/2010 | Melanson |
| 2011/0043133 A1 | 2/2011 | Van Laanen et al. |
| 2011/0080110 A1 | 4/2011 | Nuhfer et al. |
| 2011/0084622 A1 | 4/2011 | Barrow et al. |
| 2011/0084623 A1 | 4/2011 | Barrow |
| 2011/0115395 A1 | 5/2011 | Barrow et al. |
| 2011/0121754 A1* | 5/2011 | Shteynberg et al. .......... 315/294 |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0266968 A1 | 11/2011 | Bordin et al. |
| 2011/0291583 A1 | 12/2011 | Shen |
| 2011/0309759 A1 | 12/2011 | Shteynberg et al. |
| 2011/0316441 A1 | 12/2011 | Huynh |
| 2012/0049752 A1 | 3/2012 | King et al. |
| 2012/0068626 A1 | 3/2012 | Lekatsas et al. |
| 2012/0098454 A1 | 4/2012 | Grotkowski et al. |
| 2012/0112651 A1 | 5/2012 | King et al. |
| 2012/0133291 A1 | 5/2012 | Kitagawa et al. |
| 2012/0286686 A1 | 11/2012 | Watanabe et al. |
| 2013/0015768 A1 | 1/2013 | Roberts et al. |
| 2013/0154495 A1 | 6/2013 | He |
| 2013/0193879 A1 | 8/2013 | Sadwick et al. |
| 2014/0009082 A1 | 1/2014 | King et al. |

FOREIGN PATENT DOCUMENTS

| | | |
|---|---|---|
| CN | 1748446 A | 3/2006 |
| CN | 1843061 A1 | 10/2006 |
| CN | 101164383 A | 4/2008 |
| CN | 101505568 A | 8/2009 |
| CN | 101805568 A | 8/2009 |
| CN | 101707874 A | 5/2010 |
| CN | 101835314 | 9/2010 |
| CN | 101926222 | 12/2010 |
| EP | 1164819 | 12/2001 |
| EP | 2257124 A1 | 1/2010 |
| EP | 2232949 | 9/2010 |
| JP | 2008053181 A | 3/2008 |
| JP | 2009170240 A | 7/2009 |
| WO | 9917591 | 4/1999 |
| WO | 02096162 | 11/2002 |
| WO | 2006079937 | 8/2006 |
| WO | 2008029108 | 3/2008 |
| WO | 2008112822 A2 | 9/2008 |
| WO | 2010011971 A1 | 1/2010 |
| WO | 2010035155 A2 | 4/2010 |
| WO | 2011008635 A1 | 1/2011 |
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

NXP Semiconductors—SSL21082/SSL21084 Mains Dimmable LED Controller IC, Product Data Sheet, Rev. 5.1, Jan. 8, 2013, © NXP B.V. 2013, 24 pages.

NXP Semiconductors—UM10341 SSL2101 12W Mains Dimmable LED Drivre, User Manual, Rev. 2, Feb. 3, 2011, © NXP B.V. 2011, 24 pages.

Azoteq, IQS17 Family, IQ Switch -ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power

(56) References Cited

OTHER PUBLICATIONS

Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Lutron, Fluorescent Dimming Systems Technical Guide, copyright 2002, Why Different Dimming Ranges, http://www.lutron.com/TechnicalDocumentLibrary/LutronBallastpg3.pdf, p. 3, Coopersburg PA, USA.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

International Search Report, PCT/US2013/054177, European Patent Office, Dec. 2, 2013, pp. 1-4.

Written Opinion, PCT/US2013/054177, European Patent Office, Dec. 2, 2013, pp. 1-4.

Amanci, et al, "Synchronization System with Zero-Crossing Peak Detection Algorithm for Power System Applications", The 2010 International Power Electronics Conference, pp. 2984-2991, Toronto, Ontario, Canada.

Patterson, James, "Efficient Method for Interfacing Triac Dimmers and LEDs", National Semiconductor Corp., pp. 29-32, Jun. 23, 2011, USA.

Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.

Wang Xiao, Phase Control Dimming of the Dimmable Lighting System, Journal of Wuxi University of Light Industry, Jul. 31, 2000, vol. 19, No. 4, pp. 1-3. The Abstract contains a concise explanation in English and the Search Report identifies the following portions as related to the claims in the Present Application: p. 408, right-hand column, section 2, and figures 5-7.

Supertex, Inc., HV9931 Unity Power Factor LED Lamp Driver, pp. 1-7, 2005, Sunnyvale, California, USA. (Per MPEP 609.04(a), Applicant points out that the year of publication is sufficiently earlier than the effective U.S. filing date and any foreign priority date so that the particular month of publication is not in issue.).

* cited by examiner

POWER CONVERSION WITH CONTROLLED CAPACITANCE CHARGING INCLUDING ATTACH STATE CONTROL

CROSS-REFERENCE TO RELATED APPLICATION

This application claims the benefit under 35 U.S.C. §119 (e) and 37 C.F.R. §1.78 of U.S. Provisional Application No. 61/693,351, filed Aug. 27, 2012, and entitled "Single Stage and Stage and a Half LED Lamp Controller", which is incorporated by reference in its entirety.

BACKGROUND OF THE INVENTION

1. Field of the Invention

The present invention relates in general to the field of electronics, and more specifically to power conversion with controlled capacitance charging that includes a dimmer attach state control.

2. Description of the Related Art

Many electronic systems utilize switching power converters to convert power from one source into power useable by a load. Additionally, many electronic systems also utilize dimmers that cause a controller of the switching power converter to modify output power delivered to the load depending on a dimming level. For example, in a lighting system, dimmers provide an input signal to a lighting system, and the load includes one or more light sources such as one or more light emitting diodes (LEDs) or one or more fluorescent light sources. The dimming level from the dimmer causes the lighting system to adjust power delivered to a lamp, and, thus, depending on the dimming level, increase or decrease the brightness of the lamp. Many different types of dimmers exist. Many common analog based dimmers utilize a triode for alternating current ("triac") device to modulate a phase angle of each cycle of an alternating current ("AC") supply voltage. "Modulating the phase angle" of the supply voltage is also commonly referred to as "chopping" or "phase cutting" the supply voltage. Phase cutting the supply voltage causes the voltage supplied to a lighting system to rapidly turn "ON" and "OFF" thereby controlling the average power delivered to the lighting system.

Figure 1:
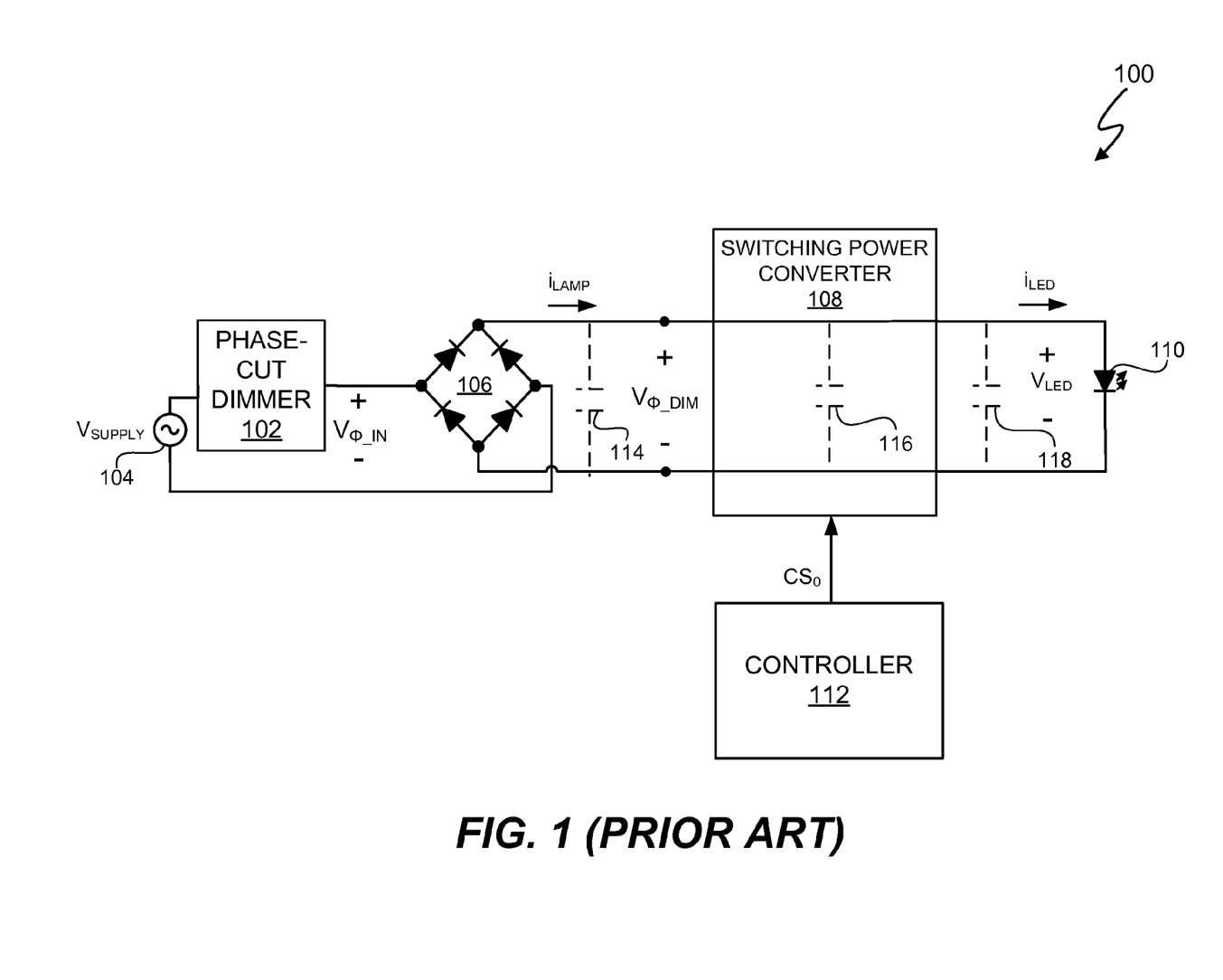
FIG. 1 (labeled prior art) depicts a lighting system having a single or multi-stage switching power converter.

FIG. 1 depicts a lighting system 100 that includes a phase cut dimmer 102. The phase-cut dimmer 102 can be any type of dimmer, such as a leading edge, trailing edge, or center-cut dimmer A triac-based leading edge dimmer is described in the Background section of U.S. patent application Ser. No. 12/858,164, entitled Dimmer Output Emulation, filed on Aug. 17, 2010, and inventor John L. Melanson. The lighting system 100 receives an AC supply voltage $V_{SUPPLY}$ from voltage supply 104. The supply voltage $V_{SUPPLY}$, indicated by voltage waveform 202, is, for example, a nominally 60 Hz/120 V line voltage in the United States of America or a nominally 50 Hz/230 V line voltage in Europe. The phase-cut dimmer 102 phase cuts the input voltage $V_{IN}$ to generate the phase-cut input voltage $V_{\Phi\_IN}$, and a full-bridge diode rectifier 106 rectifies the phase-cut input voltage $V_{\Phi\_IN}$ to generate the phase-cut, rectified, line input voltage $V_{\Phi\_DIM}$.

The lighting system 100 also includes a controller 112 that generates a control signal $CS_0$ to control the voltage $V_{\Phi\_DIM}$ into an output voltage $V_{LED}$ by a switching power converter 108. The switching power converter 108 can be any type of switching power converter. Many types of switching power converters exist. In general, switching power converters include a capacitor 114 or multiple additional capacitors (not shown) at the input of the switching power converter, a capacitor 116 within the switching power converter, and/or a capacitor 118 at the output of the switching power converter. For example, a first stage of a two stage switching power converter is typically a boost switching power converter but can also be a buck or transformer coupled stage. The second stage is, for example, a flyback, buck, or other topology, such as a resonant topology. Two stage switching power converters generally include a high frequency, electromagnetic interference capacitor at an input of the switching power converter and a link capacitor after the first stage. The capacitors store energy to smooth out the transfer of power to the load 110, and the amount of smoothing generally depends upon the capacitor size and switching power converter topology. Two stage switching power converters are flexible but generally include more components than single stage switching power converters. Thus, two stage switching power converters are generally more expensive.

A single stage switching power converter converts power directly from the phase-cut, rectified voltage $V_{\Phi\_DIM}$ into a direct current (DC) voltage for the LED(s) 110. Single stage switching power converters are, for example, flyback, buck, or boost-buck type switching power converters. The single stage switching power converters generally include one large, energy storage capacitor at location 118, and the size of the capacitor generally increases as efficiency of the LED(s) 110 increases due to the dynamic impedance of a high efficiency LED(s) 110. Peak-rectified type switching power converters include a large capacitor at the input of the switching power converter that stores energy for each cycle of the rectified voltage $V_{\Phi\_DIM}$. Peak rectified switching power converters are generally relatively inexpensive. However, the power factor of a peak-rectified switching power converter is generally worse than other single stage and two stage switching power converters, and ripple stress on the energy storage capacitor tends to be relatively high. Additionally, compatibility between the switching power converter 108 and/or efficiency is also compromised when using conventional peak-rectified switching power converters.

SUMMARY OF THE INVENTION

In one embodiment of the present invention, a method includes actively controlling a rate of charging of a capacitor circuit in a switching power converter to a first voltage level across the capacitor circuit. The method also includes allowing the capacitor to discharge to obtain a second voltage level across the capacitor circuit, wherein the second voltage level is sufficient to draw a current through a phase-cut dimmer to prevent the dimmer from prematurely resetting, and the first voltage is sufficient to allow the capacitor to discharge to the second voltage level during each cycle of the line voltage.

In another embodiment of the present invention, an apparatus includes a controller, and the controller is configured to actively control a rate of charging of a capacitor circuit in a switching power converter to a first voltage level across the capacitor circuit. The controller is also configured to allow the capacitor to discharge to obtain a second voltage level across the capacitor circuit, wherein the second voltage level is sufficient to draw a current through a phase-cut dimmer to prevent the dimmer from prematurely resetting, and the first voltage is sufficient to allow the capacitor to discharge to the second voltage level during each cycle of the line voltage.

In a further embodiment of the present invention, an apparatus includes a switching power converter having a switch and conductivity of the switch controls power conversion by the switching power converter. The apparatus also includes a load coupled to the switching power converter, a capacitor circuit coupled to the switching power converter, and a controller, coupled to the switch of the switching power converter and to the capacitor circuit. The controller is configured to actively control a rate of charging of a capacitor circuit in a switching power converter to a first voltage level across the capacitor circuit. The controller is also configured to allow the capacitor to discharge to obtain a second voltage level across the capacitor circuit, wherein the second voltage level is sufficient to draw a current through a phase-cut dimmer to prevent the dimmer from prematurely resetting, and the first voltage is sufficient to allow the capacitor to discharge to the second voltage level during each cycle of the line voltage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, a system and method include an electronic system having a controller that actively controls a rate of charging and discharging of an energy storage capacitor to maintain compatibility with a dimmer and, in at least one embodiment, provides a better power factor than a conventional peak-rectified type switching power converter. In at least one embodiment, the controller actively controls charging of a capacitor circuit in a switching power converter to a first voltage level across the capacitor circuit. In at least one embodiment, the switching power converter is a modified peak-rectified design with the first voltage level across the capacitor circuit having a value that is less than a peak value of an input line voltage supplied to the switching power converter. In at least one embodiment, the controller further allows the capacitor to discharge to obtain a second voltage level across the capacitor circuit. The second voltage level is sufficient to draw a current at the firing transition of a leading-edge dimmer. In at least one embodiment, this current is sufficient to prevent a triac of the dimmer from prematurely resetting. The first voltage is sufficient to allow the capacitor to discharge to the second voltage level during each cycle of the line voltage.

Figure 2:
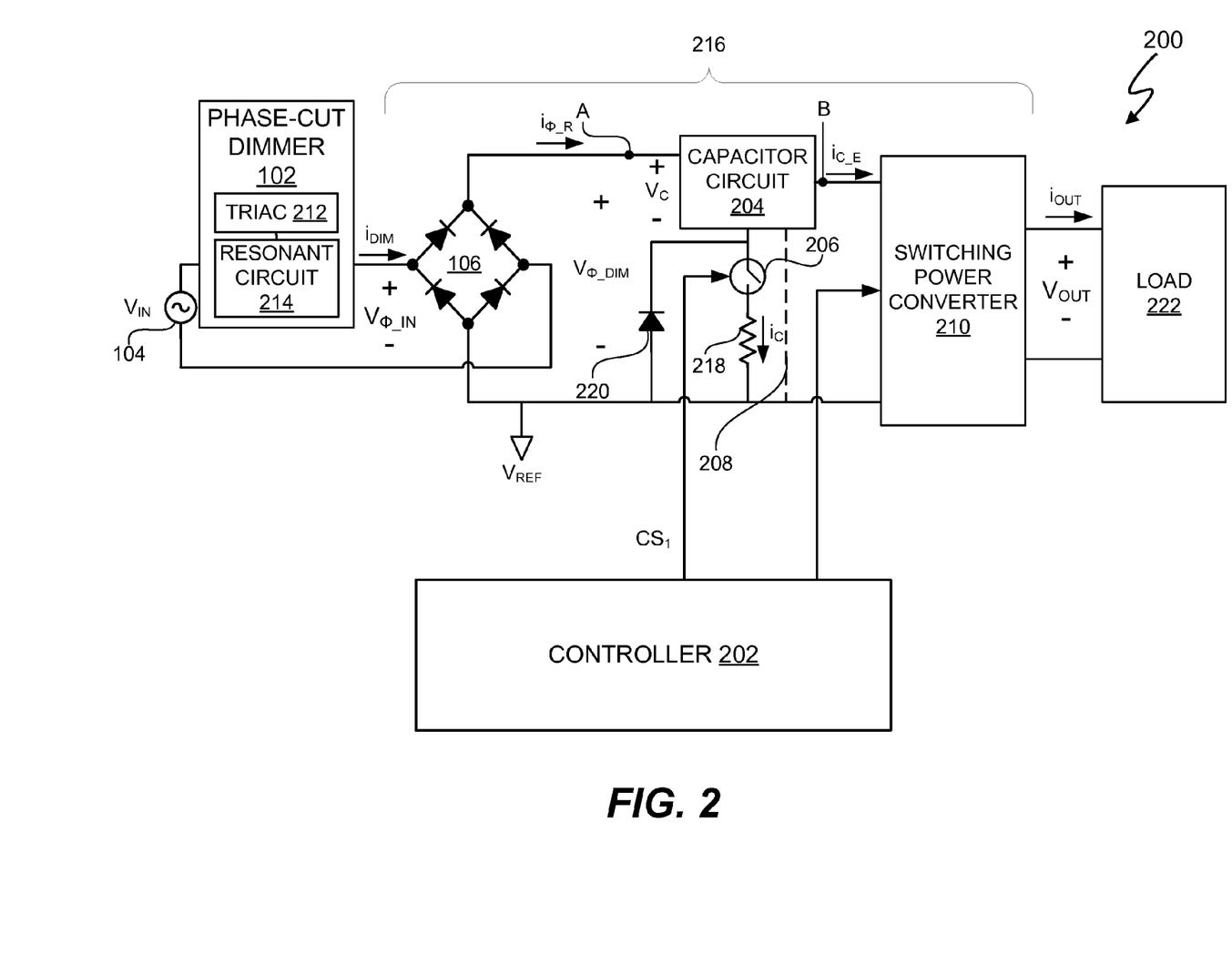
FIG. 2 depicts an electronic system that includes a controller that actively controls charging and discharging of an energy storage capacitor circuit.

FIG. 2 depicts an electronic system 200 that includes a controller 202 that actively controls charging and discharging of an energy storage capacitor circuit 204. The particular configuration of the energy storage capacitor circuit 204 is a matter of design choice. In at least one embodiment, the energy storage capacitor circuit 204 includes at least one capacitor that is connected to the switch 206 and, in at least one embodiment, includes one or more additional capacitors that connected either to the switch 206 or to the reference voltage $V_{REF}$ via conductive path 208. Controller 202 generates the switch control signal $CS_1$ to control conductivity of the switch 206. The switch 206 can be any type of switch and is, for example, a field effect transistor (FET) or a bipolar junction transistor (BJT). The switch 206 and resistor 218 together control the charging of the capacitor circuit 204. The particular circuit and device implementation of the switch 206, resistor 218, and capacitor circuit 204 is a matter of design choice. In at least one embodiment, the switch 206 as controlled by controller 202, resistor 218, and capacitor circuit 204 combine to allow a controlled charging current on the leading edge of the voltage $V_{\Phi\_DIM}$ and allow for the subsequent disconnect of the capacitor circuit 204 at a later time to provide energy to the switching power converter 210.

When the phase-cut dimmer 102 includes a triac 212 and the phase-cut dimmer 102 initially turns ON, i.e. conducts, during a cycle of the supply voltage $V_{IN}$, an inductor and capacitor in the triac-based dimmer (not shown) together form a resonant circuit 214 as, for example, explained in more detail in U.S. patent application Ser. No. 13/217,174, entitled "Multi-Mode Dimmer Interfacing Including Attach State Control", filed Aug. 24, 2011, and inventors Eric J. King and John L. Melanson, which is incorporated by reference. The resonant circuit 214 can cause abrupt voltage and current changes at the input to the switching power converter 210 when the triac 212 initially conducts. In at least one embodiment, if an input impedance presented to the triac-based, phase-cut dimmer 104 by the power converter system 216 is sufficiently high to prevent adequate damping of the resonant circuit 214, a current $i_{DIM}$ through the triac 212 will decrease below a "hold current" value. The "hold current" value is a threshold value associated with the triac 212. If the current $i_{DIM}$, which flows through the triac, decreases below the hold current value, the triac 212 will prematurely reset, i.e. become non-conductive, during a cycle of the supply voltage $V_{IN}$. If the triac 212 prematurely resets, the input voltage $V_{\Phi\_IN}$ to the power converter system 216 is disrupted, which can cause errors and disruptions to output power provided by the switching power converter 210. An exemplary error in the output power occurs when the output power does not accurately correlate with a dimming level of the phase-cut dimmer 102.

In at least one embodiment, to prevent the phase-cut dimmer 102 from prematurely resetting, after sensing a leading edge of the input voltage $V_{\Phi\_DIM}$, the controller 202 actively controls a decreasing transition of the current $i_{\Phi\_R}$, which controls the dimmer current $i_{DIM}$, to prevent the triac 212 from prematurely resetting. The process of actively controlling the decreasing transition of the current $i_{\Phi\_R}$ to prevent the triac 212 from prematurely resetting is referred to herein as "attaching the dimmer". In at least one embodiment, the controller 202 actively controls the decreasing transition of the current $i_{DIM}$ by actively controlling charging of the capacitor circuit 204 so that the voltage $V_C$ across the capacitor circuit 204 reaches a predetermined, first voltage value $V_{C\_1}$ value, as for example shown and subsequently discussed in more detail with reference to FIGS. 3 and 4.

However, in at least one embodiment, in addition to actively controlling charging the capacitor circuit 204 to the first voltage level $V_{C\_1}$ at a rate sufficient to attach the dimmer 102, the controller 202 also actively determines the value of the first voltage level $V_{C\_1}$. The controller 202 determines the value of the first voltage level $V_{C\_1}$ so that the capacitor circuit 204 provides sufficient energy to the switching power converter 210 during a portion of the cycle of the rectified, line input voltage $V_{\Phi\_DIM}$ and so that the voltage $V_C$ across the capacitor circuit 204 decays to a specific second voltage level $V_{C\_2}$ (as for example subsequently explained in more detail with reference to FIGS. 3 and 4). The second voltage level $V_{C\_2}$ allows the controller 202 to repeat attaching the dimmer to the power converter 216 and supplying sufficient energy to the switching power converter 210. Thus, by charging the capacitor circuit 204 to the first voltage value $V_{C\_1}$, the controller 202 attaches the phase-cut dimmer 102, provides energy to the switching power converter 210 during a portion of a cycle of the input voltage $V_{\Phi\_DIM}$, and establishes a second voltage level $V_{C\_2}$ that allows the controller 202 to repeat attaching the dimmer and supplying sufficient energy to the switching power converter 210.

The controller 202 actively controls charging of the capacitor circuit 204 by generating the switch control signal $CS_1$ to turn the switch 206 ON, i.e. conduct, when the controller 202 detects a leading edge of the voltage $V_{\Phi\_DIM}$. When the switch 206 is ON, current $i_C$ flows through the switch 206 and resistor 218 and charges capacitor circuit 204. The resistance of resistor 218 and the capacitance of capacitor circuit 204 provide a time constant that together with the conductivity of switch 206 controls a rate of charging and, thus, current $i_{\Phi\_R}$ draw to charge the capacitor circuit 204. The controller 202 keeps switch 206 ON until the capacitor circuit voltage $V_C$ reaches the first voltage value $V_{C\_1}$ and then turns the switch 206 OFF. The diode 220 allows the energy in the capacitor circuit 204 to be used during the periods of low input voltage levels of the voltage $V_{\Phi\_DIM}$, which partially discharges the capacitor circuit 204 to provide energy to the load 222. When the voltage $V_{\Phi\_DIM}$ falls below the capacitor circuit voltage $V_C$, the capacitor circuit 204 provides energy via current $i_{C\_E}$ to the switching power converter 210 until the next leading edge of the $V_{\Phi\_DIM}$ occurs. The switching power converter 210 provides power to the load 222 via an output voltage $V_{OUT}$ and an output current $i_{OUT}$. The switching power converter 210 can be any type of switching power converter such as a flyback, buck, boost-buck, boost, or Cúk type switching power converter. The load 222 can be any type of load, such as one or more LEDs. An exemplary system and method for detecting a leading edge of the voltage $V_{\Phi\_DIM}$ is described in U.S. patent application Ser. No. 13/077,483, entitled "Dimmer Detection", filing date Mar. 31, 2011, inventors Robert T. Grisamore, Firas S. Azrai, Mohit Sood, John L. Melanson, and Eric J. King, and assignee Cirrus Logic, Inc. and U.S. Pat. No. 8,018,171, entitled "Multi-function Duty Cycle Modifier", inventors John L. Melanson and John J. Paulos, and assignee Cirrus Logic, Inc., which are herein incorporated by reference in their entireties. If the controller 202 does not sense a leading edge of the voltage $V_{\Phi\_DIM}$, the controller selection of the first voltage level $V_{C\_1}$ and the second voltage level $V_{C\_2}$ are made to optimize power factor or efficiency of the electronic system 200. The particular values of the first voltage level $V_{C\_1}$ and the second voltage level $V_{C\_2}$ when no leading edge of the voltage $V_{\Phi\_DIM}$ is sensed are matters of design choice and, in at least one embodiment, depend on, for example, the output voltage $V_{OUT}$ for the load 222, the power requirements of the load 222. Particular values of the first voltage level $V_{C\_1}$ and the second voltage level $V_{C\_2}$ to optimize power factor or efficiency of the electronic system 200 can be determined empirically.

Figure 3:
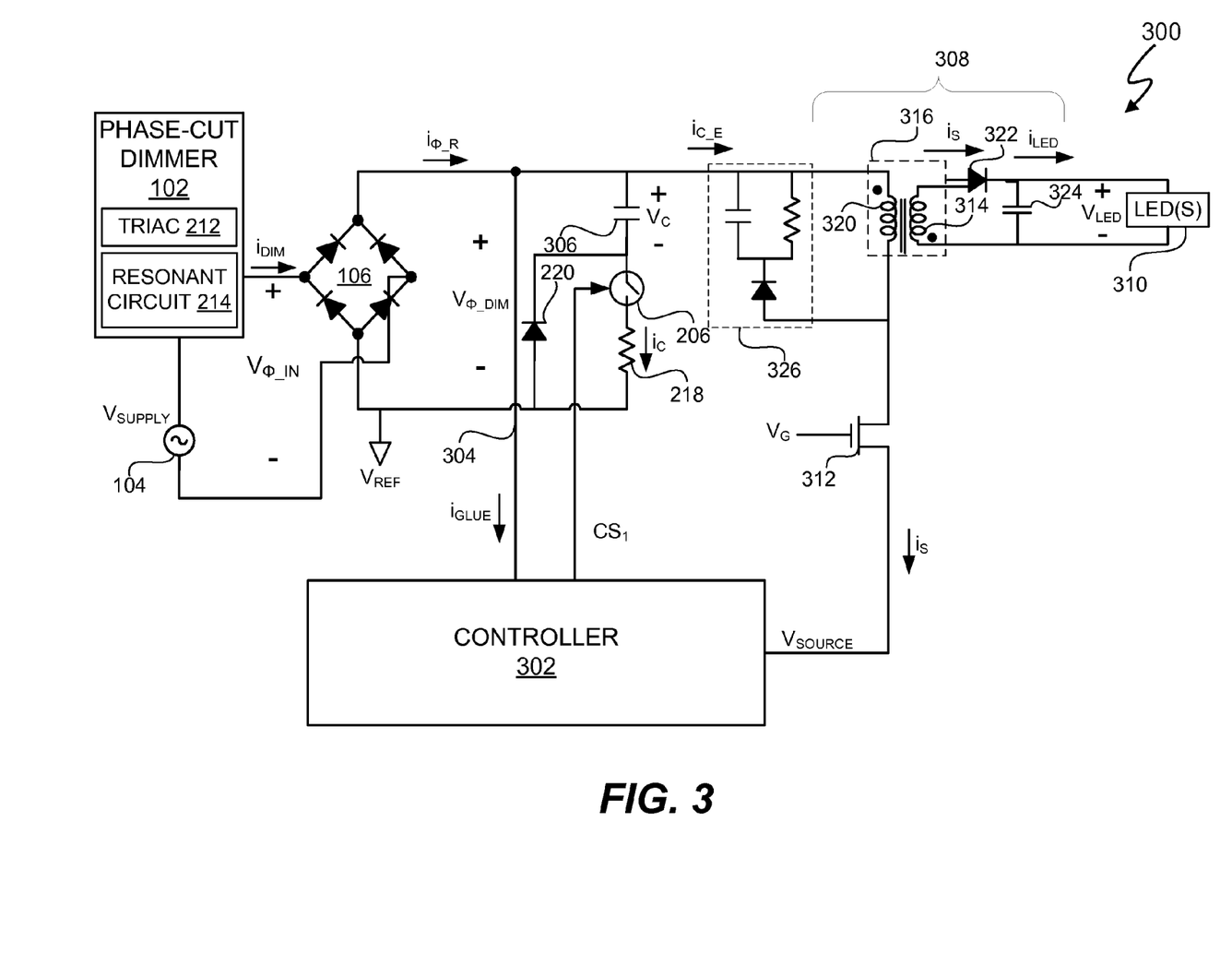
FIG. 3 depicts an electronic system that represents one embodiment of the electronic system of FIG. 2.
Figure 4:
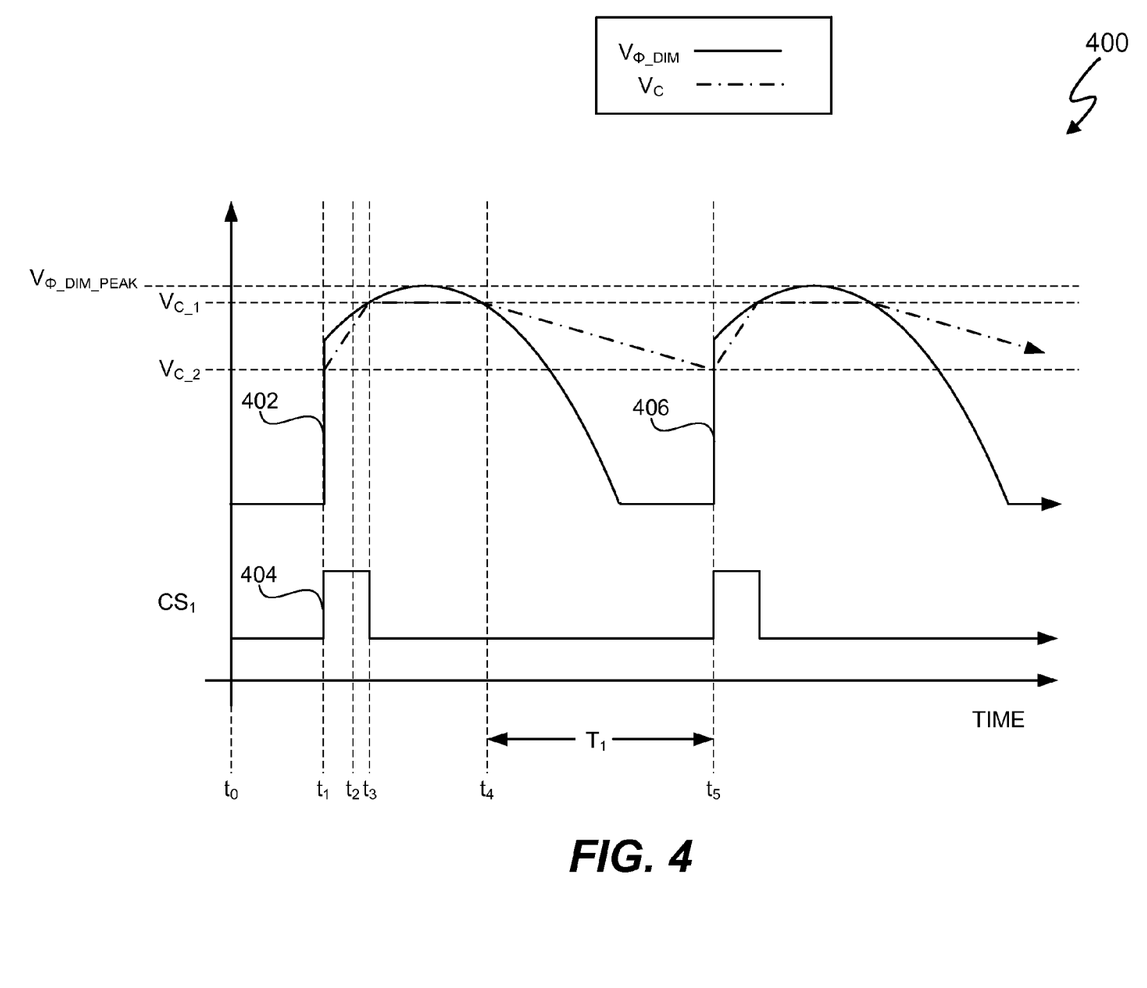
FIG. 4 depicts exemplary waveforms associated with the electronic system of FIG. 2.

FIG. 3 depicts an electronic system 300, which represents one embodiment of the electronic system 200. FIG. 4 depicts exemplary waveforms associated with the electronic system 300. Referring to FIGS. 3 and 4, at time $t_0$, the voltage $V_{\Phi\_DIM}$ is at a zero crossing, and, in at least one embodiment, the controller 302 draws a glue current $i_{GLUE}$ via path 304 to allow the triac 212 to fire, i.e. conduct, at the appropriate time indicated by an internal timing mechanism of the phase-cut dimmer 102. U.S. patent application Ser. No. 12/858,164, entitled "Dimmer Output Emulation", filed Aug. 17, 2010, and inventor John L. Melanson and U.S. patent application Ser. No. 13/290,032, entitled "Switching Power Converter Input Voltage Approximate Zero Crossing Determination", filed Nov. 4, 2011, and inventors Eric J. King and John L. Melanson, are herein incorporated by reference and describe exemplary embodiments of generating the glue current.

At time $t_1$, the controller 302 detects the leading edge 402 of the voltage $V_{\Phi\_DIM}$ and generates a pulse 404 of the control signal $CS_1$ to turn the switch 206 ON. At the end of the previous cycle (not shown) of the voltage $V_{\Phi\_DIM}$, the voltage $V_C$ across the capacitor 306 was at the second voltage level $V_{C\_2}$. Capacitor 306 represents one embodiment of the capacitor circuit 204. The value of capacitor 306 is typically 0.5-20 uF, depending on the output voltage $V_{OUT}$ for the load 222, power, ripple requirements, and design choice. With the switch 206 conducting, at time $t_1$ the voltage $V_C$ across the capacitor 306 rises from the second voltage level $V_{C\_2}$ to the first voltage level $V_{C\_1}$. Between times $t_1$ and $t_2$, the current $i_C$ flowing through switch 206 and causing the capacitor 306 to charge to the first voltage level $V_{C\_1}$ is sufficient to attach the dimmer. At time $t_2$, the voltage $V_C$ across the capacitor 306 reaches the first voltage level $V_{C\_1}$, and the controller 302 generates the control signal $CS_1$ to turn the switch 206 OFF. Thus, the voltage $V_C$ rises to the first voltage level $V_{C\_1}$ during the initial portion of the voltage $V_{\Phi\_DIM}$ after the leading edge 402 occurs. However, unlike a conventional peak-rectified system, the rate of the rise of the voltage $V_C$ is actively controlled by the controller 202 using the switch 206 and the resistor 218, and the voltage $V_C$ rises to a first voltage level $V_{C\_1}$, which, in at least one embodiment, is less than the peak value $V_{\Phi\_DIM\_PEAK}$ of the line input voltage $V_{\Phi\_DIM}$.

The voltage $V_C$ across the capacitor 306 remains at the first voltage level $V_{C\_1}$ until, at time $t_4$, the line input voltage $V_{\Phi\_DIM}$ falls below the first voltage level $V_{C\_1}$. At time $t_5$, the next leading edge 406 of the voltage $V_{\Phi\_DIM}$ occurs. Between times $t_4$ and $t_5$, which is in the trough of the line input voltage $V_{\Phi\_DIM}$, the voltage $V_C$ is higher than the line input voltage $V_{\Phi\_DIM}$, and the capacitor 306 provides energy via the current $i_{C\_E}$ to the flyback-type, switching power converter 308. As the capacitor 306 provides energy to the switching power converter 308, the voltage across the capacitor 306 decreases, and at time $t_2$ reaches the second voltage level $V_{C\_2}$.

Equation 1 represents the amount of energy $E_{C\_TRANFERRED}$ transferred from the capacitor 306 to the switching power converter 308 during the period $T_1$:

$$E_{C\_TRANFERRED} = \tfrac{1}{2} \cdot C \cdot (V_{C\_1}^2 - V_{C\_2}^2) \qquad \text{Equation 1}$$

where C is the capacitance value of capacitor 306, $V_{C\_1}$ is the first level voltage value across the capacitor 306, and $V_{C\_2}$ is the second level voltage value across the capacitor 306. In at least one embodiment, the particular value of the voltage $V_{C\_2}$ correlates with the phase angle of the line input voltage $V_{\Phi\_DIM}$ and can be empirically determined for each phase angle for a particular load, such as the LED(s) 310.

Equation 2 represents the amount energy $E_{SPC}$ to be provided to the switching power converter 308 for a given phase angle of the line input voltage $V_{\Phi\_DIM}$:

$$E_{SPC} = T_1 \cdot P \qquad \text{Equation 2}$$

where $T_1$ is the period of time between times $t_4$ and $t_5$, which represents the amount of time that the capacitor 306 is providing energy to the switching power converter 308. The controller 302 determines the value of $T_1$ by determining the time between when the controller 302 causes the switch 206 to stop conducting and when the controller 302 detects the next leading edge of the voltage $V_{\Phi\_DIM}$. P is the amount of power provided to the switching power converter 308 for conversion and provision to the LED(s) 310. In at least one embodiment, the value of the amount of power P is predetermined for each phase angle since the amount of power to be provided to the LED(s) 310 directly correlates to the phase angle of the voltage $V_{\Phi\_DIM}$ and the corresponding power utilization by the LED(s) 310. U.S. Pat. No. 7,852,017, entitled "Ballast for Light Emitting Diode Light Sources", filed Mar. 12, 2008, assignee Cirrus Logic, Inc., which is herein incorporated by reference, describes exemplary systems and methods for detecting voltage phase angles.

In at least one embodiment, the controller 302 determines the values of the first level voltage $V_{C\_1}$ and the time $T_1$ so that Equation 1 equals Equation 2 for the known values of the capacitance C of the capacitor 306, the second level voltage value $V_{C\_2}$, and the amount of power P provided to the switching power converter 308. In at least one embodiment, the controller 302 iterates over consecutive cycles of the voltage $V_{\Phi\_DIM}$ to obtain the values of the first level voltage $V_{C\_1}$ and the time $T_1$ so that Equation 1 equals Equation 2. In at least one embodiment, the values of the variables in Equation 1 and Equation 2 are initialized using empirically obtained data, and controller 302 iterates the values if during operation of the electronic system 300, Equation 1 does not equal Equation 2 using the initialized values. In other words, if the desired value of the second level voltage $V_{C\_2}$ is not met on a cycle of the voltage $V_{\Phi\_DIM}$, then the value of the first level voltage $V_{C\_1}$ is adjusted for the next cycle. In at least one embodiment, this iterative process maximizes efficiency of the electronic system 200 and compatibility between the power converter 216 and the phase-cut dimmer 102.

The controller 302 utilizes the flyback-type switching power converter 308 to convert the voltage $V_{\Phi\_DIM}$ into an LED drive current $i_{LED}$ and load voltage $V_{LED}$ on the side of the secondary-winding 314 of the transformer 316. The controller 302 provides source control to the source of the FET 312 to control the flyback-type, switching power converter 308 and, thus, control the current $i_{C\_E}$, the LED drive current $i_{LED}$, and the load voltage $V_{LED}$. The values of the current $i_{C\_E}$, the LED drive current $i_{LED}$, and the load voltage $V_{LED}$ correlate with the phase angle of the voltage $V_{\Phi\_DIM}$. The brightness of the LED(s) 310 directly correlates with the value of the LED drive current $i_{LED}$. Thus, the brightness of the LED(s) 310 directly conforms to the phase angle of the voltage $V_{\Phi\_DIM}$.

The controller 302 controls the conductivity of the FET 312 to control the current $i_{C\_E}$ to meet the power demands of LED(s) 310. For an n-channel FET, the FET 312 is biased with a fixed gate voltage $V_G$ and conducts (i.e. ON) when the source voltage $V_{SOURCE}$ is less than the gate voltage $V_G$ minus a threshold voltage of the FET 606 and is nonconductive (i.e. OFF) when the source voltage $V_{SOURCE}$ is greater than the gate voltage $V_G$ minus the inherent threshold voltage of the FET 312. When the FET 312 conducts, the current $i_{C\_E}$ ramps up through the primary winding 320 of transformer 316. The dot convention of transformer 316 and the diode 322 prevent flow of the LED current $i_{LED}$ from the secondary-winding 314 when FET 312 conducts and the current $i_{C\_E}$ is flowing into the primary winding 320. When the controller 302 turns the FET 312 OFF, the current $i_{C\_E}$ falls to 0, and the voltage across the primary winding 320 reverses for a period of time, referred to as the "flyback time". During the flyback time, the secondary current $i_S$ quickly rises and charges capacitor 324. Capacitor 324 provides an output voltage $V_{LED}$ and current $i_{LED}$ to the LED(s) 310. A diode and resistor-capacitor filter circuit 326 provides a path for voltage perturbations.

An exemplary flyback-type switching power converter and corresponding control and auxiliary power supply is described in U.S. patent application Ser. No. 13/715,451, entitled "Isolation of Secondary Transformer Winding Current During Auxiliary Power Supply Generation", inventors John L. Melanson, Prashanth Drakshapalli, and Siddharth Maru, filing date Dec. 14, 2012, which is incorporated by reference in its entirety. U.S. patent application Ser. No. 12/289,845, entitled "Controlled Power Dissipation in a Switch Path in a Lighting System", filed Nov. 4, 2011, and inventors John L. Melanson and Eric J. King, and U.S. patent application Ser. No. 13/774,914, entitled "Mixed Load Current Compensation for LED Lighting", filed Feb. 22, 2013, and inventors Eric J. King, John L. Melanson, and Daniel J. Baker, are hereby incorporated by reference and describe exemplary systems and methods for controlling the source of a FET. The particular implementation of controller 302 is a matter of design choice. For example, controller 302 can be (i) implemented as an integrated circuit including, for example, a processor to execute software or firmware instructions stored in a memory, (ii) implemented using discrete components, or (iii) implemented using any combination of the foregoing. Additionally, in at least one embodiment, all of the components in electronic system 300, except the voltage supply 104 and the phase-cut dimmer 102 are included in a lamp.

Figure 5:
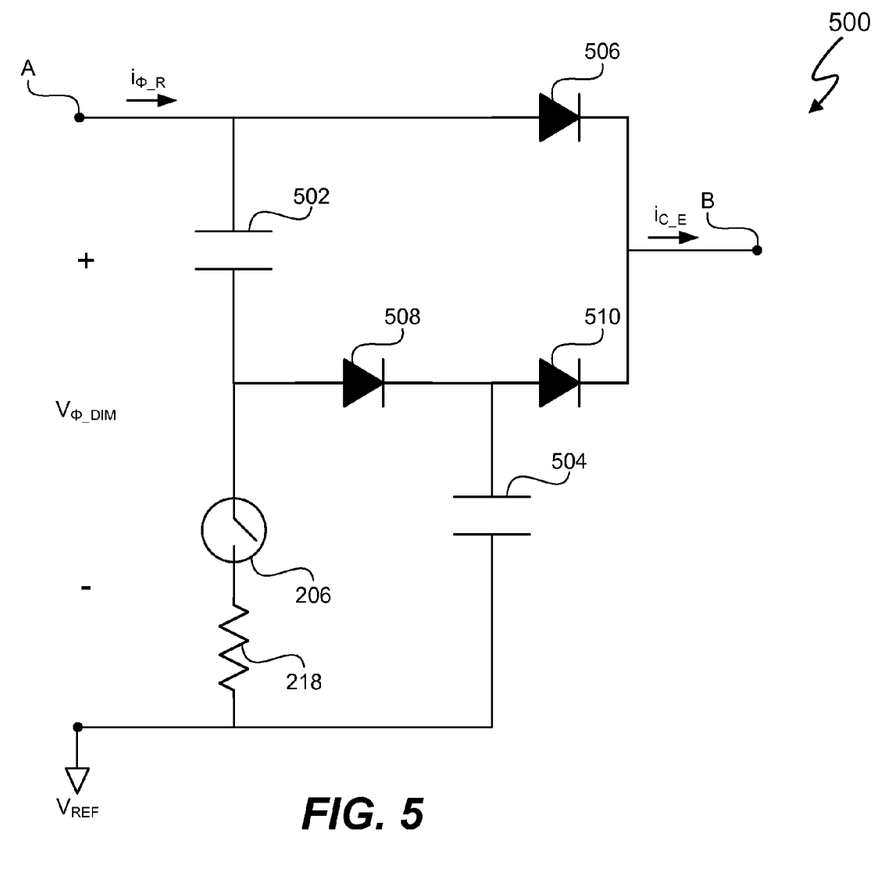
FIG. 5 depicts an exemplary capacitor circuit.

FIG. 5 depicts a capacitor circuit 500, which represents another embodiment of the capacitor circuit 204. For reference purposes, nodes A and B correspond with the nodes A and B of FIG. 2. The capacitor circuit 500 includes capacitor 502 that charges when the switch 206 is ON. When switch 206 is OFF, the capacitors 502 and 504 discharge through diodes 506, 508, and 510. By utilizing two capacitors 502 and 504, more current is drawn in phase with the voltage $V_{\Phi\_DIM}$ when the voltage $V_{\Phi\_DIM}$ has no phase cuts, which increases the power factor of the electronic system 200. The values of capacitors 502 and 504 are typically 0.5-20 uF, depending on the output voltage $V_{OUT}$ for the load 222, power utilized by the load 222, ripple requirements, and design choice. The two values of the capacitors 502 and 504 can be the same, or may differ, with capacitor 502 typically having a larger capacitance than capacitor 504. Thus, an electronic system includes a controller that actively controls a rate of charging and discharging of an energy storage capacitor to maintain compatibility with a dimmer. The controller actively controls charging of a capacitor circuit in a switching power converter to a first voltage level across the capacitor circuit. The controller further allows the capacitor to discharge to obtain a second voltage level across the capacitor circuit. The second voltage level is sufficient to provide a decreasing transition of a current through a triac-based dimmer to prevent a triac of the dimmer from prematurely resetting. The first voltage is sufficient to allow the capacitor to discharge to the second voltage level during each cycle of the line voltage.

Although embodiments have been described in detail, it should be understood that various changes, substitutions, and alterations can be made hereto without departing from the spirit and scope of the invention as defined by the appended claims.

What is claimed is:
1. A method comprising:
   actively controlling a rate of charging of a capacitor circuit in a switching power converter to a first voltage level across the capacitor circuit, wherein actively controlling the rate of charging of the capacitor circuit comprises actively controlling conductivity of a switch coupled to the capacitor circuit, and the conductivity of the switch controls current flow in a sole current path for current charging the capacitor circuit; and allowing the capacitor to discharge to obtain a second voltage level across the capacitor circuit, wherein the second voltage level is sufficient to draw a current through a phase-cut dimmer to prevent the dimmer from prematurely resetting, and the first voltage is sufficient to allow the capacitor to discharge to the second voltage level during each cycle of the line voltage.

2. The method of claim 1 wherein actively controlling charging of the capacitor comprises:
controlling current through the capacitor circuit at a rate that prevents a triac of the phase-cut dimmer from prematurely resetting and allows the voltage across the capacitor circuit to reach the first voltage level.

3. The method of claim 2 wherein controlling current through the capacitor circuit further comprises:
controlling conductivity of a switch coupled to the capacitor circuit.

4. The method of claim 3 wherein the switch is a member of a group consisting of: a bipolar junction transistor and a field effect transistor.

5. The method of claim 1 wherein actively controlling charging of the capacitor circuit further comprises:
setting the first voltage level and the second voltage level so that discharging a capacitor network from the first voltage level to the second voltage level supplies an approximate amount of energy to a load, which is coupled to the switching power converter, wherein the amount of energy correlates with a phase angle of an input line voltage supplied to the switching power converter.

6. The method of claim 1 wherein:
actively controlling charging of the capacitor circuit further comprises:
controlling one or more switches to regulate current from a terminal of the capacitor circuit that is coupled to a reference voltage node; and
allowing the capacitor to discharge to obtain a second voltage level across the capacitor circuit comprises:
controlling the one or more switches to cease current flow through the one or more switches.

7. The method of claim 1 wherein the capacitor circuit consists of a single capacitor.

8. The method of claim 1 wherein the capacitor circuit comprises multiple capacitors.

9. The method of claim 1 wherein the first voltage level across the capacitor circuit is less than a peak value of an input line voltage supplied to the switching power converter.

10. The method of claim 1 wherein the phase-cut dimmer is a triac based dimmer that includes a triac, and the second voltage level is sufficient to draw a current through the triac-based dimmer to prevent the triac of the dimmer from prematurely resetting, and the first voltage is sufficient to allow the capacitor to discharge to the second voltage level during each cycle of the line voltage.

11. An apparatus comprising:
a controller, wherein the controller is configured to:
actively control a rate of charging of a capacitor circuit in a switching power converter to a first voltage level across the capacitor circuit, wherein to actively control the rate of charging of the capacitor circuit comprises to actively control conductivity of a switch coupled to the capacitor circuit, and the conductivity of the switch controls current flow in a sole current path for current charging the capacitor circuit; and
allow the capacitor to discharge to obtain a second voltage level across the capacitor circuit, wherein the second voltage level is sufficient to draw a current through a phase-cut dimmer to prevent the dimmer from prematurely resetting, and the first voltage is sufficient to allow the capacitor to discharge to the second voltage level during each cycle of the line voltage.

12. The apparatus of claim 11 wherein to actively control charging of the capacitor the controller is further configured to:
control current through the capacitor circuit at a rate that prevents a triac of the phase-cut dimmer from prematurely resetting and allows the voltage across the capacitor circuit to reach the first voltage level.

13. The apparatus of claim 12 wherein to control current through the capacitor circuit the controller is further configured to:
control conductivity of a switch coupled to the capacitor circuit.

14. The apparatus of claim 13 wherein the switch is a member of a group consisting of: a bipolar junction transistor and a field effect transistor.

15. The apparatus of claim 11 wherein to actively control charging of the capacitor circuit the controller is further configured to:
set the first voltage level and the second voltage level so that discharging a capacitor network from the first voltage level to the second voltage level supplies an approximate amount of energy to a load, which is coupled to the switching power converter, wherein the amount of energy correlates with a phase angle of an input line voltage supplied to the switching power converter.

16. The apparatus of claim 11 wherein:
to actively control charging of the capacitor circuit the controller is further configured to:
control one or more switches to regulate current from a terminal of the capacitor circuit that is coupled to a reference voltage node; and
to allow the capacitor to discharge to obtain a second voltage level across the capacitor circuit the controller is further configured to:
control the one or more switches to cease current flow through the one or more switches.

17. The apparatus of claim 11 wherein the capacitor circuit consists of a single capacitor.

18. The apparatus of claim 11 wherein the capacitor circuit comprises multiple capacitors.

19. The apparatus of claim 11 wherein the first voltage level across the capacitor circuit is less than a peak value of an input line voltage supplied to the switching power converter.

20. The apparatus of claim 11 wherein the phase-cut dimmer is a triac based dimmer that includes a triac, and the second voltage level is sufficient to draw a current through the triac-based dimmer to prevent the triac of the dimmer from prematurely resetting, and the first voltage is sufficient to allow the capacitor to discharge to the second voltage level during each cycle of the line voltage.

21. The apparatus of claim 11 wherein the controller comprises an integrated circuit.

22. An apparatus comprising:
a switching power converter having a switch and conductivity of the switch controls power conversion by the switching power converter;
a load coupled to the switching power converter;
a capacitor circuit coupled to the switching power converter;
a switch coupled to the capacitor circuit; and
a controller, coupled to the switch of the switching power converter and to the capacitor circuit, wherein the controller is configured to:

actively control a rate of charging of a capacitor circuit in a switching power converter to a first voltage level across the capacitor circuit, wherein to actively control the rate of charging of the capacitor circuit comprises to actively control conductivity of the switch, and the conductivity of the switch controls current flow in a sole current path for current charging the capacitor circuit; and allow the capacitor to discharge to obtain a second voltage level across the capacitor circuit, wherein the second voltage level is sufficient to draw a current through a phase-cut dimmer to prevent the dimmer from prematurely resetting, and the first voltage is sufficient to allow the capacitor to discharge to the second voltage level during each cycle of the line voltage.

23. The apparatus of claim 22 wherein the load comprises one or more light emitting diodes.

\* \* \* \* \*